US 6,719,942 B1

(12) United States Patent
Triplett et al.

(10) Patent No.: US 6,719,942 B1
(45) Date of Patent: Apr. 13, 2004

(54) METHOD AND APPARATUS FOR PRODUCTION OF TUBING

(76) Inventors: David A. Triplett, 3601 Old Tasso Rd., Cleveland, TN (US) 37312; Gary Winner, 198 Quail Run Trace, Cleveland, TN (US) 37311; Tom McKeehan, 3601 Old Tasso Rd., Cleveland, TN (US) 37312; Claude R. Ellis, 3601 Old Tasso Rd., Cleveland, TN (US) 37312

(*) Notice: Subject to any disclaimer, the term of this patent is extended or adjusted under 35 U.S.C. 154(b) by 446 days.

(21) Appl. No.: 09/656,744

(22) Filed: Sep. 7, 2000

Related U.S. Application Data (60) Provisional application No. 60/152,877, filed on Sep. 8, 1999.

(51) Int. Cl.⁷ ............................................. B29C 53/52
(52) U.S. Cl. .................... 264/508; 264/568; 264/209.4; 425/195; 425/233; 425/326.1; 425/336; 425/369; 425/384; 425/388; 425/396
(58) Field of Search ................................. 264/508, 568, 264/209.3, 209.4; 425/233, 195, 326.1, 336, 369, 384, 388, 396

(56) References Cited

U.S. PATENT DOCUMENTS

| | | | | |
|---|---|---|---|---|
| 3,208,229 A | * | 9/1965 | Fulton | 62/5 |
| 3,776,679 A | * | 12/1973 | Hegler | 425/396 |
| 3,981,663 A | * | 9/1976 | Lupke | 425/326.1 |
| 4,212,618 A | * | 7/1980 | Hegler et al. | 425/326.1 |
| 4,439,130 A | | 3/1984 | Dickhut et al. | 425/388 |
| 4,718,844 A | | 1/1988 | Dickhut et al. | 425/522 |
| 5,017,321 A | * | 5/1991 | Comfort | 264/508 |
| 5,059,109 A | | 10/1991 | Dickhut et al. | 425/233 |
| 5,164,204 A | * | 11/1992 | Weppert et al. | 425/336 |
| 5,257,924 A | | 11/1993 | Dickhut et al. | 425/326.1 |
| 5,494,430 A | | 2/1996 | Berns et al. | 425/326.1 |
| 5,510,071 A | | 4/1996 | Van Wonderen et al. | 264/166 |
| 5,531,583 A | | 7/1996 | Berns et al. | 425/193 |
| 5,560,941 A | * | 10/1996 | Hegler et al. | 425/233 |
| 5,645,871 A | | 7/1997 | Berns et al. | 425/326.1 |
| 5,682,758 A | * | 11/1997 | Jones | 62/374 |
| 5,693,347 A | * | 12/1997 | Hegler | 425/233 |
| 5,773,044 A | * | 6/1998 | Dietrich et al. | 425/336 |

* cited by examiner

Primary Examiner—Robert Davis
Assistant Examiner—Joseph S. Del Sole
(74) Attorney, Agent, or Firm—Stephen J. Stark; Miller & Martin LLP (57) ABSTRACT

A method and apparatus for producing an extruded product includes a machine that cooperates with an extruder. The machine is commonly used as a corrugator and the extruded product is often corrugated piping. The machine has a frame supporting a trackway in a continuous path. A plurality of mold block assemblies travel about the continuous path to form a mold tunnel along a portion of the continuous path. The mold block assemblies include a carriage connected by at least one guide and linear bearings to a pair of mold holders. The mold holders are connected to at least one pair of opposing mold blocks. Guides and directors position the mold block pairs relative to one another while the assemblies travel along the continuous path. As the holders, and thus the mold block halves, are linearly displaceable from one another, the halves may meet to form the mold tunnel and separate to allow removal of the extruded product.

37 Claims, 11 Drawing Sheets

METHOD AND APPARATUS FOR PRODUCTION OF TUBING

This application claims the benefit of U.S. Provisional Application No. 60/152,877 filed Sep. 8, 1999.

BACKGROUND OF THE INVENTION

The present invention relates generally to production of thermoplastic tubing and formable plastic products and, more particularly, relates to a method and apparatus for producing small and large diameter thermoplastic tubing and composite tubing structures.

DESCRIPTION OF RELATED ART

One known method for manufacturing corrugated pipes is to extrude a tube of thermoplastic from a head and then conform that tube to the interior of a corrugated mold tunnel formed by mold blocks. Mold blocks typically come in pairs and mate together to form a portion of the mold tunnel, and the thermoplastic is either blown into shape (by pressure created within the plastic tunnel) or vacuumed into shape (where vacuum draws the air from around the mold tunnel). Typically, the mold blocks operate in a clam shell-type fashion such that each of the mold block pairs pivot on an axis into mating engagement with one another. Examples of clam shell type corrugators are shown in U.S. Pat. Nos. 5,645,871; 5,494,430; 4,439,130 and others. The clam shell-type shape of mold blocks are susceptible to "sawtooth" imperfections which can occur throughout the mold tunnel. Sawtoothing occurs when successive mold blocks are tilted slightly rather than perfectly aligned with the axis of the mold tunnel. The hinged mold carrier, when closed, has a tendency to lean back in the opposite direction of travel during the molding process. This "sawtoothing" creates molding lines as well as a potential loss of vacuum.

The clam hell type mold carriers typically require the use of multiple custom-machined components and have a high manufacturing cost. The hinge pin is subject to external forces which results in wear on the hinge pin. A worn hinge pin may not allow the mold to pivot closed properly which could prevent the tubing firm forming properly. Furthermore, wear and misalignment of the pivoting pairs may result in the hinged mold carrier bending or breaking some of the custom-machined components.

At least one prior art device, U.S. Pat. No. 5,510,071 teaches a pair of mold blocks that are operated differently from the clam shell variety. Instead of using a hinged pivot, as is customary in the art, this device allows for transverse linear recipcal travel for closing and opening of the mold block pair. The apparatus taught by the '071 Patent utilizes reciprocal linear travel for the carriage supporting the mold blocks. There is no teaching in the '071 Patent to utilize linearly opening and closing of mold block pairs in a continuous loop corrugator.

Typically mold blocks must be maintained within an acceptable range of temperatures during the molding process. However, during the extrusion press, hot plastic is extruded into the mold blocks which tends to heat the blocks. To maintain acceptable temperatures the blocks must be cooled. Cooling of mold blocks maybe a problem. Inadequate cooling of mold blocks may lead to excessive temperatures for the molding process and result in degradation of the quality of molded tubes. Too much cooling may result in crackling of the exterior surface of molded tubes thereby giving the impression of an alligator-like skin on the pipe surface. Traditionally, mold blocks have been water cooled with internal cooling passages within each blocks. Failure of water lines and water leakage is a problem for many corrugator designs. If significant water leaks into the mold cavity during molding, a defective product may result, requiring the corrugator to be shut down, the leak located and the mold block or other leaking component repaired. Accordingly improved cooling techniques are desired.

In order to keep mold blocks in contact with the product to produce good forming characteristics, prior art corrugators utilize chain driven mold blocks where mold blocks are located substantially around the entire perimeter of a continuous path. At least one improvement is illustrated by U.S. Pat. Nos. 5,494,430 and 5,531,583 where a mold train drive and a shuttle drive are utilized to minimize the number of mold blocks. Nevertheless, this system relies on gearing and at least two separate chain drives: one to shuttle molds from the end of the mold tunnel to the beginning of the mold tunnel and one to drive molds through the mold tunnel.

The mechanical drive system utilized by corrugator designs in the prior art typically have mechanical drives comprised of motors, gear boxes, gear reductions, transmissions, sprockets, chains, idler sprockets, power take off shafts and other mechanical drive systems. These drive methods and systems may require extensive maintenance. Furthermore, these drive methods are subject to wear as many components are in direct contact with one another. There is also the potential problem of backlash in the driving mechanisms, which may be accentuated in the propulsion of the molds.

The corrugators such as taught by U.S. Pat. Nos. 5,494,430; 5,645,871; and others are known as vertical style corrugators. A forming mold tunnel is in line with the extrusion head die. The non-forming (return) of the mold chain is typically overhead or below the product center line. As shown in FIG. 2 of U.S. Pat. No. 5,494,430, the molds which are not in use in the mold process are typically open and cannot be used in the manufacture of product until they return to the forming side of the corrugator. This results in a machine having a greater height in the vertical plane and does not utilize the non-forming molds in production. U.S. Pat. No. 5,257,924 teaches at least one method for using multiple molding sections in a corrugator.

Maintaining a vacuum is another concern in many corrugator and mold designs. U.S. Pat. Nos. 4,718,844 and 5,059,109 teach at least two different vacuum configurations for mold blocks. Thermoexpansion of forming molds can cause vacuum loss through the vacuum interface during production. The vacuum interface is typically a rigidly fixed device that interfaces with the molds. If the interface is not complete, vacuum leakage will occur. Although it appears that improvements have been made to the mold blocks for maintaining vacuum, the interface with the vacuum does not appear to have been thoroughly perfected.

With the clam shell style mold carriers, the mold carriers typically operate on an oval track. The radius on the curved portions of the track typically is relatively large. This causes a need for the extrusion die to be of relatively long length. Longer dies have been found to create problems in the manufacture of double walled tubing such as high head pressures and/or uneven distribution of the extruding plastic. Furthermore, long die lengths reduce the potential selection of materials to be utilized which could otherwise be utilized with shorter die lengths.

A need exists to utilize materials such as polyvinylchloride (PVC). Polyvinylchloride (PVC) requires a shorter die length than is available in many prior art corrugators.

When constructing some prior art corrugators, a mold chain length has been fixed. If a customer has a special product, or wants to increase or decrease the length of the machine, the customer could typically expect extensive modifications to be required and performed upon that particular corrugator. Today, there is a high demand for greater and greater speed which often results in longer and longer forming tunnels. For instance, when a 20-foot mold section was once found adequate, a consumer now may desire a 40-foot mold section. This modification may be extensive and require a lengthy down time for the machine.

SUMMARY OF THE INVENTION

The present invention recognizes and addresses the foregoing disadvantages, and others, of prior art construction and methods. Accordingly, it is an object of the present invention to provide an improved machine, such as a corrugator, for making plastic tubing or other formed plastic product. A trackway defining a continuous path and a plurality of carriages for carrying mold blocks about the continuous path are utilized. Each of the carriages transports at least one pair of mold blocks which are linearly displacable from one another. In a closed configuration, a first and second pair element of a pair of mold blocks engages with one another along a molding section of the continuous path to form an axial portion of a mold tunnel in the molding section. Using the linear closing mechanism, the molds may be operated on a continuous path which has a quick, i.e., smaller, entrance radius. A small entrance radius in a continuous path allows for extrusion dies to be shortened. With a die of shorter length, the traditional problem of die length is reduced. Accordingly, rapidly solidifying materials such as polyvinylchloride (PVC) may be utilized to make corrugated tubing.

The mold blocks open and close preferably using a non-hinged carrier. This carrier is comprised of a main plate with two linear slot bearings which are mounted in a manner to allow the mold to open evenly away from the product. Accordingly, the carrier need not hinge away from itself. The linear non-hinged mold carrier, is preferably composed largely of "off-the-shelf" components which may provide for quick field repairs without the need to remachine mold locating surfaces. Furthermore, the radius and angle of curvature of the continuous track may assist in correct positioning of opposing mold blocks when forming the mold tunnel without having mold surfaces wear against one another.

The mold blocks may be balanced by use of sprockets and chain. Movement of one block may drive the opposing block in a similar fashion (i.e., inward or outward). The balanced design is believed to assist in prolonging the life of components and may assist in faster production rates due to lower power consumption.

In an alternative embodiment, linear motors operate in conjunction with programmable logic controls to engage a select number of carriages at the beginning of the mold tunnel to continuously drive the carriages along the mold tunnel. The linear motor working with programmable logic controls is also able to shuttle carriages which are not in the mold tunnel along portions of the continuous path at a higher rate of speed than the speed of the mold blocks along other sections of the continuous path. Linear motors may be used independently of mechanical drive mechanisms such as gear boxes, chains, transmissions, and the like. The linear motor may accelerate a carriage which leaves the mold tunnel, shuttle the out-of-service mold block through a second section of the continuous path, decelerate the carriage prior to the beginning of the mold tunnel and maintaining a predetermined speed, speeds, and/or positions through the mold tunnel. The more preferable method of moving the carriages is to use a drive rod and sprocket to drive at least one at a time with the driven carriage pushing the others about the continuous loop.

The mold block may be utilized in conjunction with a vacuum machine for molding tubes. In a preferred embodiment, the tube product is corrugated. The mold block is preferably adapted to moving about an endless path and cooperates with other blocks to define a molding tunnel with a vacuum source along a portion of the path. In an alternative embodiment, at least two molding tunnels may be formed at two different portions of the continuous path.

The mold blocks may include a plurality of sub-blocks secured end to end. Each sub-block has a face arcuate about a longitudinal axis and corrugated with at least one complete wave length of circumferential grooves and lands. A vacuum channel within the mold block provides access from a vacuum source to the interior portion of the mold. The vacuum passage is connected to a vacuum source at a vacuum interface as the mold block passes along the mold tunnel. The vacuum interface in the molding section or sections preferably utilizes a cushion. This cushion may be pneumatic or mechanical such as springs and allows for the interface to adjust as the forming molds thermally expand without binding or leakage.

The corrugator utilizes at least one molding section and may include a shuttle section. In a transition section, a one or more tracks direct the mold carrier and the mold blocks to a closed position where they are maintained through a molding section. A second transition section contains one or more tracks which may assist in guiding the mold blocks to an open position to allow the extruded product to be removed. Preferably, the track(s) and rollers prevent "sawtoothing" by properly aligning a pair of mold blocks in a closed configuration during the molding section.

Preferably the machine is constructed in a horizontal fashion instead of a vertical planer fashion such that the molds move in a horizontal fashion. The vertical profile is lowered by not having two mold sets one above another. Furthermore, the shorter profile allows easier accessability to the molds and carriers for maintenance and changeover. Horizontal design may also allow for increasing production requirements. If a continuous mold chain is utilized instead of shuttling the molds at a high rate of speed in nonforming sections, it is possible to mold corrugators in two directions. Accordingly, a single corrugator could have output coming from at least a first mold tunnel and a second mold tunnel. Another advantage of the horizontal design is the ability to quickly change mold blocks in the carriers which allows a single corrugator to manufacture a plurality of different products by swapping out the mold blocks on the carriers.

The mold blocks may be cooled in a number of ways. The traditional water cooling techniques may be utilized. Ambient air cooling, such as may be achieved by passing the open mold blocks through space when not molding, may also be utilized. If this cooling is not sufficient alone, forced air cooling may also be utilized. One method of forced air cooling includes the use of vortex nozzles. The vortex nozzles may be mounted in locations which allow for optimum thermal transfer of heat away from the mold. Utilizing cooling vortex nozzles, the traditional method of water cooling within the mold blocks may be eliminated.

A second method of cooling which may be utilized includes spraying the mold blocks with a solution (such as water or an evaporable solution). Using this second method, the thermodynamics of the heat of vaporization of the evaporating substance is utilized to increase the efficiency of the cooling process.

The corrugator of the preferred embodiment is also modularly constructed in sections. These sections interlock with one another. Accordingly, a single carrier design may be utilized regardless of a particular configuration length needed. A machine may be taken apart at a location, section(s) inserted, and the machine reconnected with the new section installed. In this manner, a single machine may be configured for different lengths or types of products. Modifications may be performed in a short period of time. Also, parts of like machines can be interchangeable. Furthermore, machines may be combined in tandem for ultra high-speed production and then separated for standard rate production. Modularity is also an advantage as components can be sold directly to the customer for in-house changes. Modularity allows for higher volume production of like parts which may reduce the individual part costs.

Additional objects and advantages of the invention will be set forth in part in the following description, or may be obvious from the description or accompanying drawings, or may be learned through the practice of the invention.

The accompanying drawings, which are incorporated in and constitute a part of the specification, illustrate several embodiments of the invention and together with the description, serve to explain the principles of the invention.

BRIEF DESCRIPTION OF THE DRAWINGS

A full and enabling disclosure of the present invention, including the best mode thereof and directed to one of ordinary skill in the art, as set forth in the specifications, which makes reference to the appended drawings in which.

Repeat use of reference numerals in the present specification represent like, similar or analogous parts, structures or elements of the present invention throughout several views.

DETAILED DESCRIPTION OF THE PREFERRED EMBODIMENT

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield still a further embodiment. Thus, it is intended that the present invention covers such modifications and variations as come within the scope of the appended claims and their equivalents.

Figure 1:
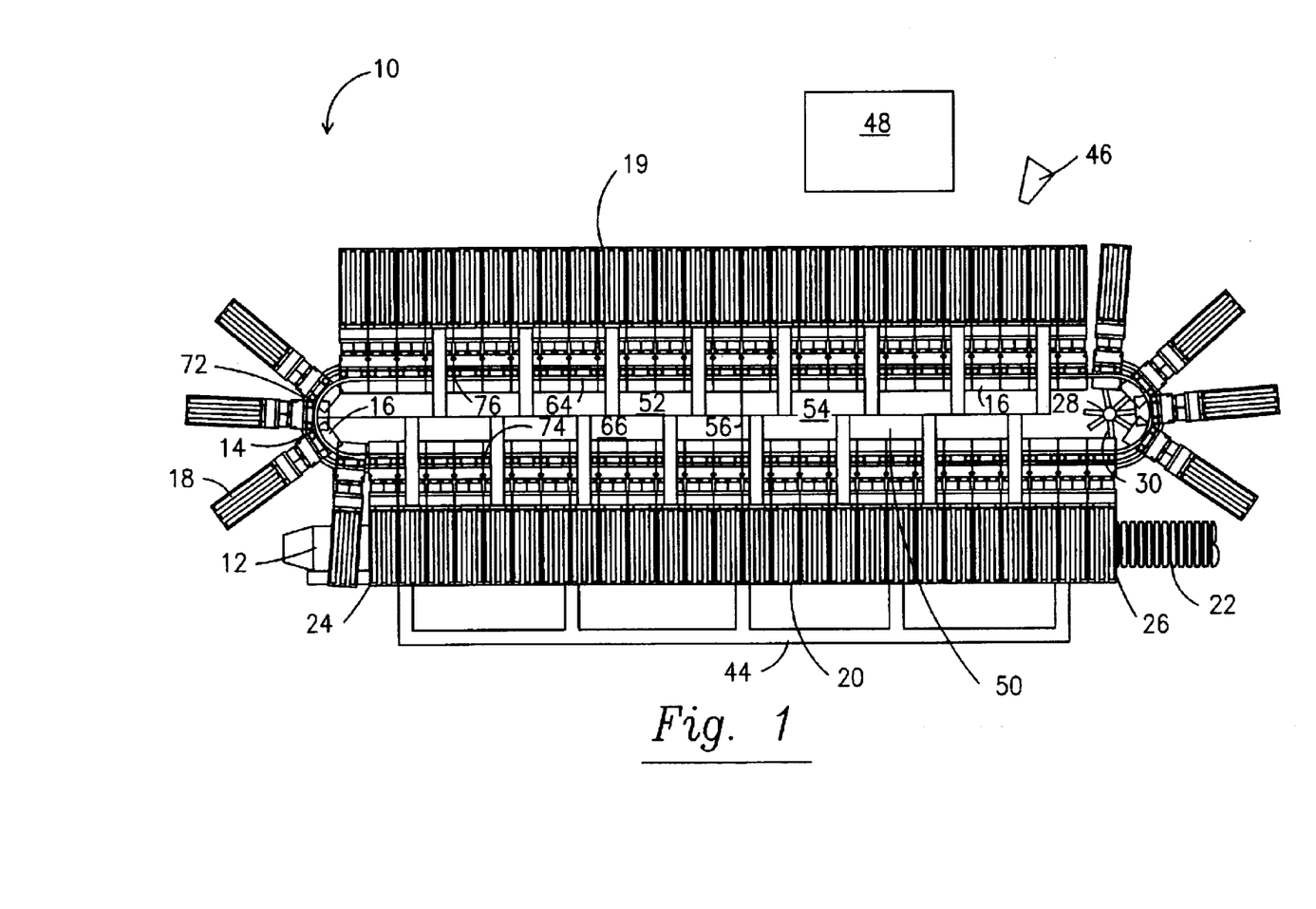
FIG. 1 is a top diagramatic view of a mechanically driven embodiment of the invention.

Referring to FIG. 1, a machine 10, in the form of a corrugator is illustrated. The machine 10 is cooperable with a first extruder 12 to continuously mold an extrudable material such as a plastic. The machine 10 utilizes at least one continuous path 14 which is preferably located on machine 10. A plurality of separate carriages 16 carry mold blocks about the continuous path 14 of said machine 10. Each of the carriages 16 carries at least one pair of mold blocks, illustrated as mold block pairs 18. The mold block pairs 18 are displacable from one another and are capable of mating engagement with one another along a molding section 20 of the continuous path 14. When the mold block pairs 18 are in mating engagement with one another and closed to form a mold tunnel, plastic may be molded within to form piping 22 or other products. The mold blocks move along the continuous path 14 to enter the molding section 20 at its beginning 24 and exit at the molding section end 26. The preferred method of driving the carriages 16 about the continuous paths 14 is to utilize a drive shaft 28 with spokes 30 which engage at least one carriage 16 at a time. Since adjacent carriages 16 are substantially adjacent to one another in the preferred embodiment, all of the carriages 16 may be moved by driving one or more of the carriages 16.

Figure 2:
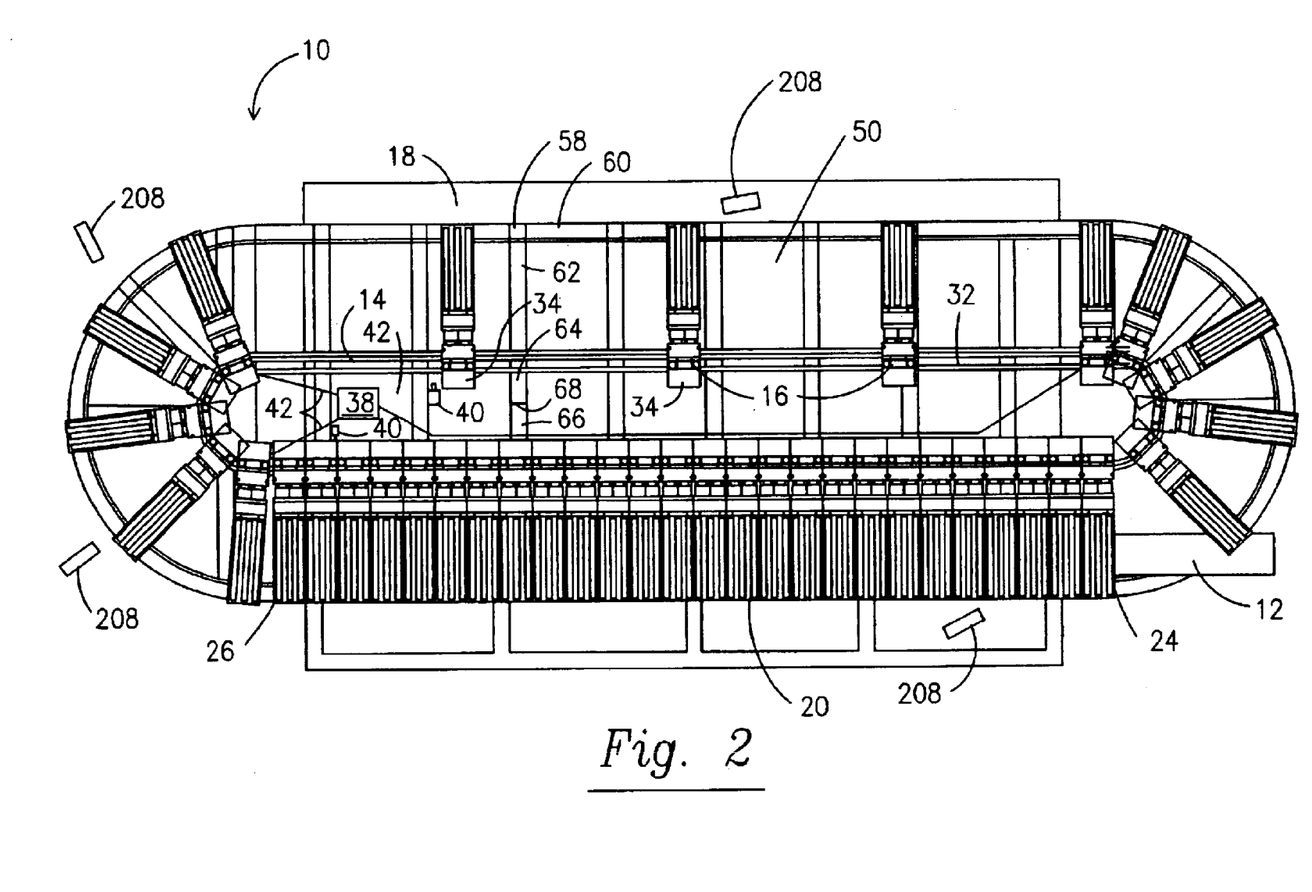
FIG. 2 is a top plan view of an alternative embodiment of the invention driven by linear motors.

In an alternative embodiment, the machine 10 may utilize a linear motor drive system as shown in FIG. 2 which has at least one stator 32 which is located proximate to the continuous path 14. Rotor elements 34 which are connected to the carriages 16 in this embodiment. In some embodiments, it may not be necessary to have a rotor element 34 on every carriage 16, however, the embodiment illustrated in FIG. 2 has rotor elements 34 on every carriage 16.

If linear motors are utilized, multiple stators 32 may be required to propel the carriages 16 at different speeds along the path 14. A control device 38 may be connected to a plurality of stators 32 to achieve the desired changes of speeds in different locations. Furthermore, sensors 40 may also be utilized along the continuous path 14 or at other locations to monitor position of carriages 16 and mold block pairs 18 (collectively referred to as mold block assemblies 36) and provide information to the controller 38.

By using a higher speed at portions of the continuous path 14 where a particular mold block pair 18 is not in use in a molding section 20, the carriage 16 may be shuttled to another portion along the continuous path 14. This process would allow for fewer mold block pairs 18 and mold block assemblies 36. Fewer mold block pairs 18 and mold block assemblies 36 could result in a lower cost of the overall machine 10.

Also in the alternatively preferred embodiment illustrated in FIG. 2, connectors 42 link the control device 38 to stators 32. Furthermore, the control device 38 may incorporate an electronic power supply device, and a computer or controller, which may generate appropriate signals to the stator 32. The signals may be the driving force which propels the mold block assemblies 36 around the continuous path 14. Accordingly, the requirement for mechanical drive devices such as chains to propel the mold block assemblies 36 around the continuous loop 14 may be eliminated in this embodiment. The positioning of connections 42 allows for the speed of the mold block assemblies 36 to be adjusted at different locations along the continuous path 14. Other locations and connections 42 may be necessary or desired for particular applications. The control device 38 utilized to control the speed of the mold block assemblies 54 preferably uses "quick carrier return technology" which allows for the shuttling carriages 16 of unused mold blocks pairs 16 at a higher rate of speed relative to the progress of mold blocks pairs 18 through the mold tunnel 20.

Referring back to FIG. 1, the machine 10 also has a vacuum system which is supported by a vacuum support 44. The vacuum support 44 houses a plenum which connects a vacuum source to a vacuum interface. FIG. 1 also shows a cooling technique using a mister 46 and blower 48. Other details of the vacuum system and cooling technique will be discussed below.

Figure 3:
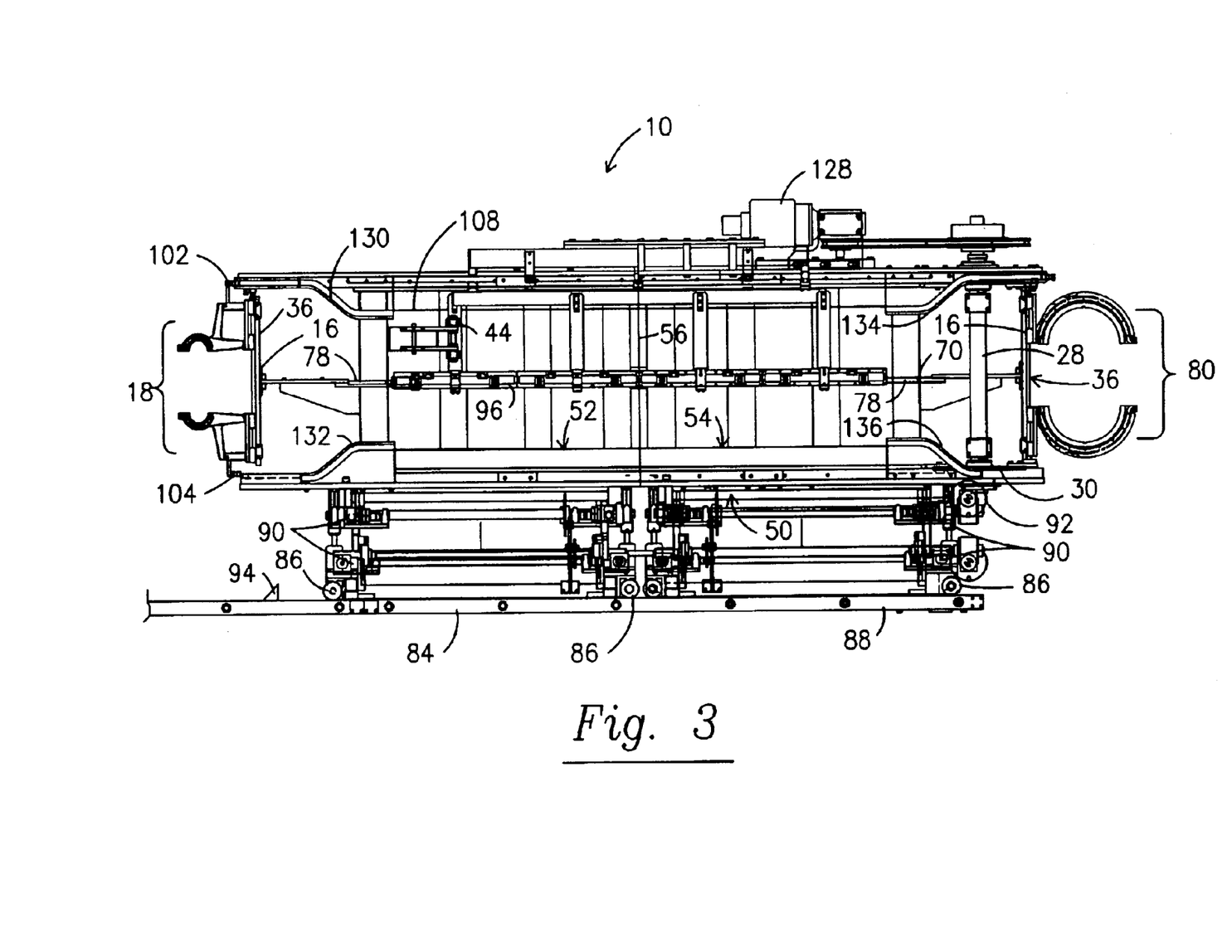
FIG. 3 is a detailed side plan view of a preferred mechanically driven embodiment of the invention with only tow mold block assemblies shown.

The machine 10 is constructed in a modular fashion. FIG. 3 illustrates the frame 50 of the machine 10 in two sections: first frame section 52 and second frame section 54 connected at interface 56. First frame section 52 may be disconnected from second frame section 54, the two spread apart and a third frame section may be inserted to make the machine 10 larger. In the alternative embodiment of FIGS. 2 and 4, a third frame section 58 and fourth frame section 60 are illustrated as having widths from only about half that of a single mold block assembly 36 up to that of about three mold block assemblies 36 and are connected at junction 62. Utilizing smaller frame sections 58,60 may allow for more precise sizing of the continuous path 14. Furthermore, as shown in FIGS. 1 and 2, a frame section 58 may include first and second frame sub-sections 64, 66. Sub-sections 64,66 together include an entire width of the machine 10. The sub-sections 64, 66 meet at interface 68. First, second, or fourth sections 52, 54, 60 may also be comprised of such sub-sections which permit the width of the machine 10 to be adjusted by the use of varied width subsections or spacers between subsections. Accordingly, frame sections 52, 54, 58, 60 may be as large or as small as needed for a particular application and make the modular machine 10 easier to adapt to a particular need. Furthermore, as illustrated in FIG. 3, the machine 10 may be disconnected at connection 70 and raised in the vertical direction to accommodate taller carriages 16 or for other modification reasons.

In FIGS. 1 and 3, first and second sections 52, 54 could be disconnected at interface 56 in order to lengthen the machine 10. Accordingly, two continuous path portions of the first and second sections 52, 54 and an inserted section (not shown) would form a new longer the continuous path 14. Alternatively, in the embodiment illustrated in FIGS. 1 and 2, other portions or sections of the machine 10 may be removed to allow for shortening of the machine 10 to accommodate a shorter mold tunnel 20 if desired. By utilizing this manner of modular construction, the length or shape of the continuous path 14 of the machine 10 may be adjusted.

The continuous path 14 of the machine 10 is preferably constructed in an oval shape. This shape has been found to minimize the space required by the machine 10. Other configurations may also be constructed. Sections of the continuous path 14 of the frame 50 and the oval configuration illustrated in FIG. 1 have curved portions such as curved portion 72. Curved portion 72 may have a semicircular or other curved shape to transition the continuous path 14 from a first linear section 74 to a second linear section 76. The curved section 72 may be utilized by itself or in conjunction with other curved sections 72 to transition a first linear section 74 of the continuous path 14 to a second linear section 76 of continuous path 14. The preferred connection system for different portions of the frame 50 is to utilize releasable connectors at the interfaces or junctions of the frame sections. Pins and bores may be suitable connectors. A pin may be anything which fits within a cavity of the frame 50 such as a bolt or dowel.

Details of the machine 10 have been omitted from many of the figures in order to clearly illustrate the invention. However, it should be understood that such details are not directly relevant to the concept of the present invention, and that different types of machines could also incorporate the present invention. For example, when the illustrated embodiment uses a vacuum to conform an extrudable material, such as plastic, to the mold blocks as described in detail hereafter, the present design could be used with different mold blocks, etc., or could even be used with a corrugator structure which uses different means, such as internal pressure, to conform the plastic to the mold blocks.

Figure 5:
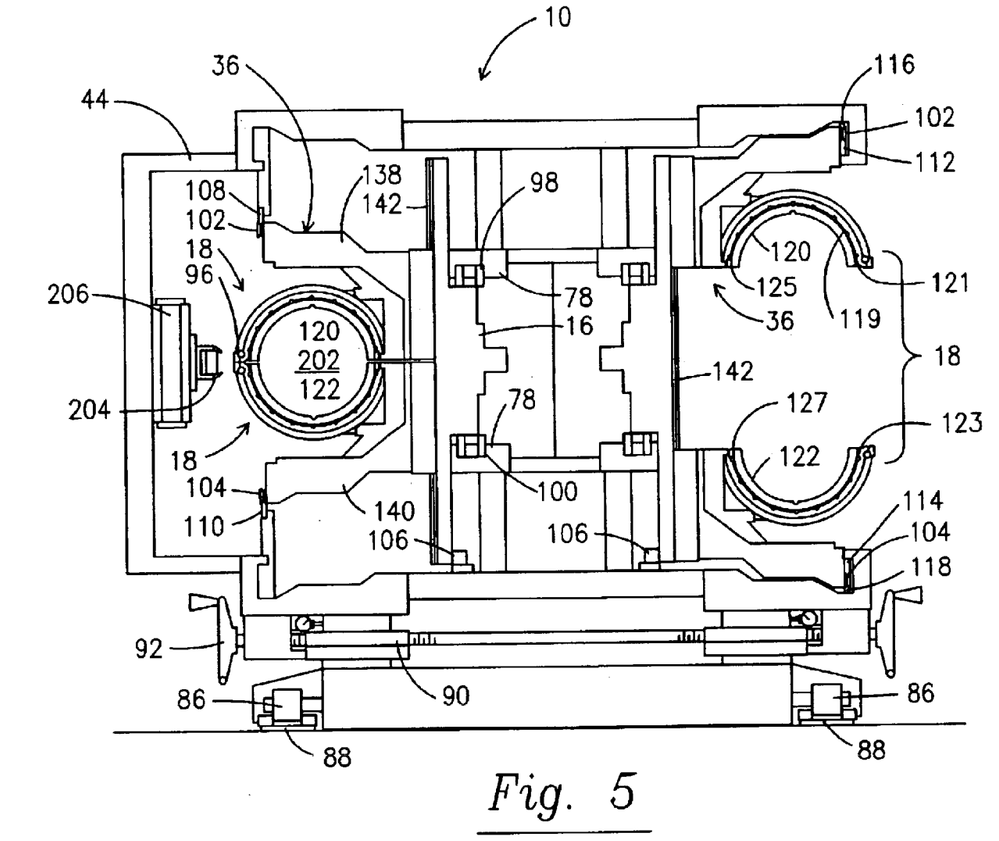
FIG. 5 is a front plan view of the machine of FIG. 4 taken along the line A—A showing a mold block in the open position, and a mold block in the closed configuration.

In the alternative embodiment of FIG. 5, the mold block assemblies 36 are illustrated as being driven about a path in the form of a trackway 78. The trackway 78 is preferably horizontally oriented, that is, the mold block assemblies 36 are carried by the trackway 78 for movement in a substantially horizontal plane (i.e., parallel to the floor where the machine 10 is located). The trackway 78 of the preferred embodiment is illustrated in FIGS. 3 and 5. The trackway 78 provides a support for the carriages 16 as they traverse about the continuous path 14. It is preferred that the trackway 78 support a large portion of the weight of the carriages 16 which is believed to assist in extending the longevity of the machine 10 while providing for faster rates of production. Additionally, the two sizes of mold block pairs 18, 80 illustrated in FIG. 3 are for illustrative purposes. Although different size mold blocks 18, 80 could be utilized during product formation, a transition between sizes would be required. For the production of corrugated piping, mold block pairs of a single size are typically utilized.

Figure 8:
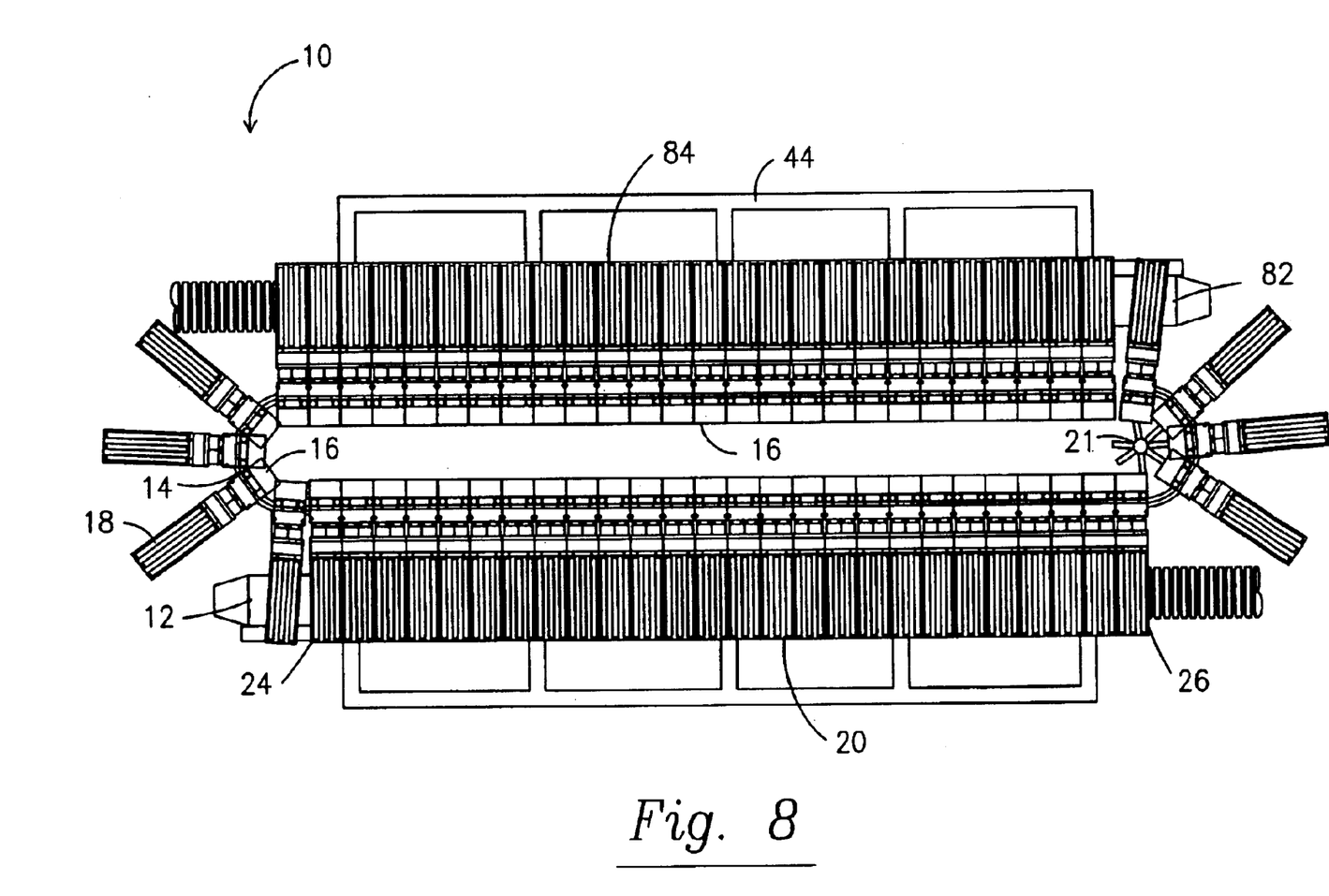
FIG. 8 is a top plan view of an alternative configuration showing the use of two extruders.

An extruder 12 is provided adjacent to the beginning of the mold section 20 and, in the alternative embodiment of FIG. 8, extruders 12, 82 are provided for the machine 10 and two mold tunnels: a first mold tunnel 20 and a second mold tunnel 84. These two mold tunnels 20, 84 have extruders 12, 82 adjacent thereto. The extruder 12 or extruders 12, 82 may or may not be connected to the frame 50 in some manner.

It is contemplated that at least portions of an extruder 12 may be moved back and forth toward and away from the beginning of the associated mold section 20. For instance, as illustrated in FIGS. 3–6, the frame 50 may include rollers 86 which allow the machine 10 to be moved relative to a stationary extruder 12. In the preferred embodiment, the rollers 86 are located on one or more tracks 88 which allow a single operator to move the machine 10 relative to the extruder 12. Movement of the machine, or an extruder 12 may be necessary during start up and shut down of the machine 10. Alternatively, moving portions of an extruder 12 or frame 50 may be necessary for maintenance.

In most applications, the material to be extruded, normally a plastic, is heated to the desired temperature and forced into the nozzle of the extruder 12. The machine 10 is then rolled into position with the extruder nozzle extending into the mold tunnel 20. A plurality of adjustment mechanisms 90 preferably operated by cranks 92 are utilized to provide for precise positioning of the machine 10 relative to the extruder 12. Cranks 92 are preferably hand wheels, but automated equipment could also be utilized such as electric servos or stepper motors, especially if the machine 10 is equipped with a sophisticated control device 38 that may also control these motors. Care should be taken for the extruder nozzle to not contact the mold blocks 18 in the mold tunnel 20 during extrusion as aluminum mold blocks 18 would be easily damaged. Accordingly, the adjustment mechanisms 90 allow for very precise adjustment of the mold tunnel 20 relative to the frame 50. Specifically, the adjustment mechanisms 90 may allow for in excess of two inches of movement vertically at either end of the frame 50 in very minute increments as well as in excess of two inches of movement laterally at the mold tunnel beginning 24 and end 26. Stops 94 illustrated in FIG. 3 are utilized to located the machine 10 relative to the extruder nozzle, and adjustment mechanisms 90 are also utilized to adjust the distance of the mold tunnel beginning 24 from the extruder nozzle.

Figure 6:
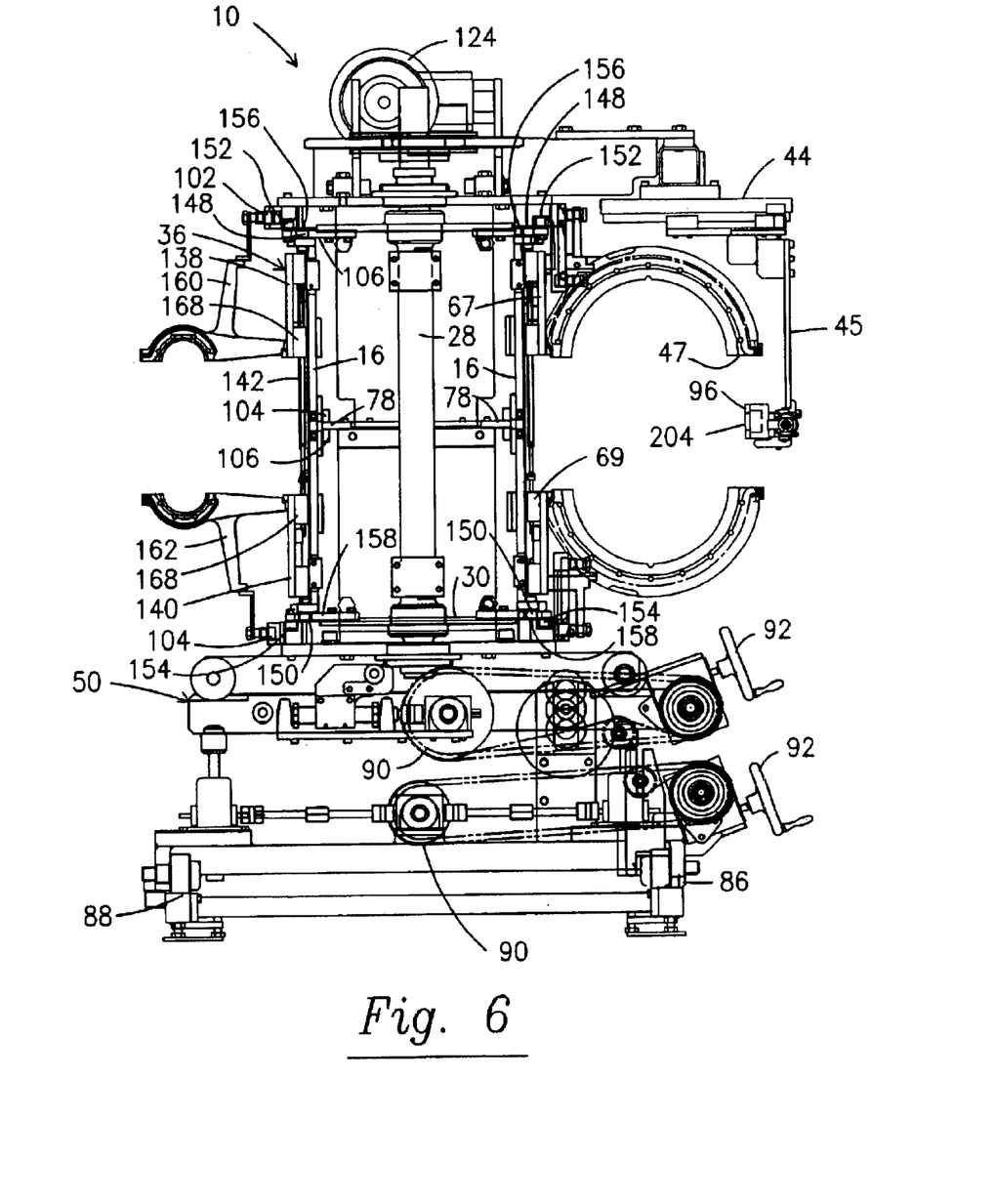
FIG. 6 is a detailed front plan view of the machine of FIG. 3 showing mold blocks of two different sizes.

FIG. 6 shows the vacuum frame 44 supports ducts 45 which are provided along the mold tunnel 20. The ducts 45 communicate with a manifold 47 in the mold block pairs 18 as described hereafter to draw a vacuum around the outside of the extruded material in the molding sections 20.

A plurality of mold block assemblies 36 are supported and guided by the trackway 78 for rolling action thereon. Preferably, all mold block assemblies 36 are alike on any particular machine 10.

Regarding the mold assembly 36 of the embodiment shown in FIG. 5, each mold block assembly 36 has a carriage 16 which supports the pair of mold blocks 18. The carriage 16 is supported on rollers 98, 100 which may be a portion of the carriage 16 or may be a portion of the trackway 78, as illustrated in this embodiment. Additional support for the mold block assemblies 36 may be provided by rollers 102, 104. Furthermore, raceways, tracks or bearings 106 may be utilized to maintain the carriage 16 in its proper location along the trackway 78. The rollers 98–104 and bearings 106 may be utilized to enable the mold block assemblies 36 and more particularly the carriages 16 to roll along the trackway 78 without derailing or excessive resistance.

To maintain the mold block pairs 18 of the mold block assemblies 36 in alignment and to assure that the carriages 16 roll properly within the trackway 78, raceways 108–118 are provided along the trackway 78. The raceways 108–118 assist in the opening and closing of the mold block pairs 18. The mold block pair 18 has a first mold half 120 and a second mold half 122. The first and second mold block halves 120, 122 are substantially mirror images of each other, and each is an open ended semi-cylinder having a corrugated inner wall formed by alternating grooves and lands.

Figure 4:
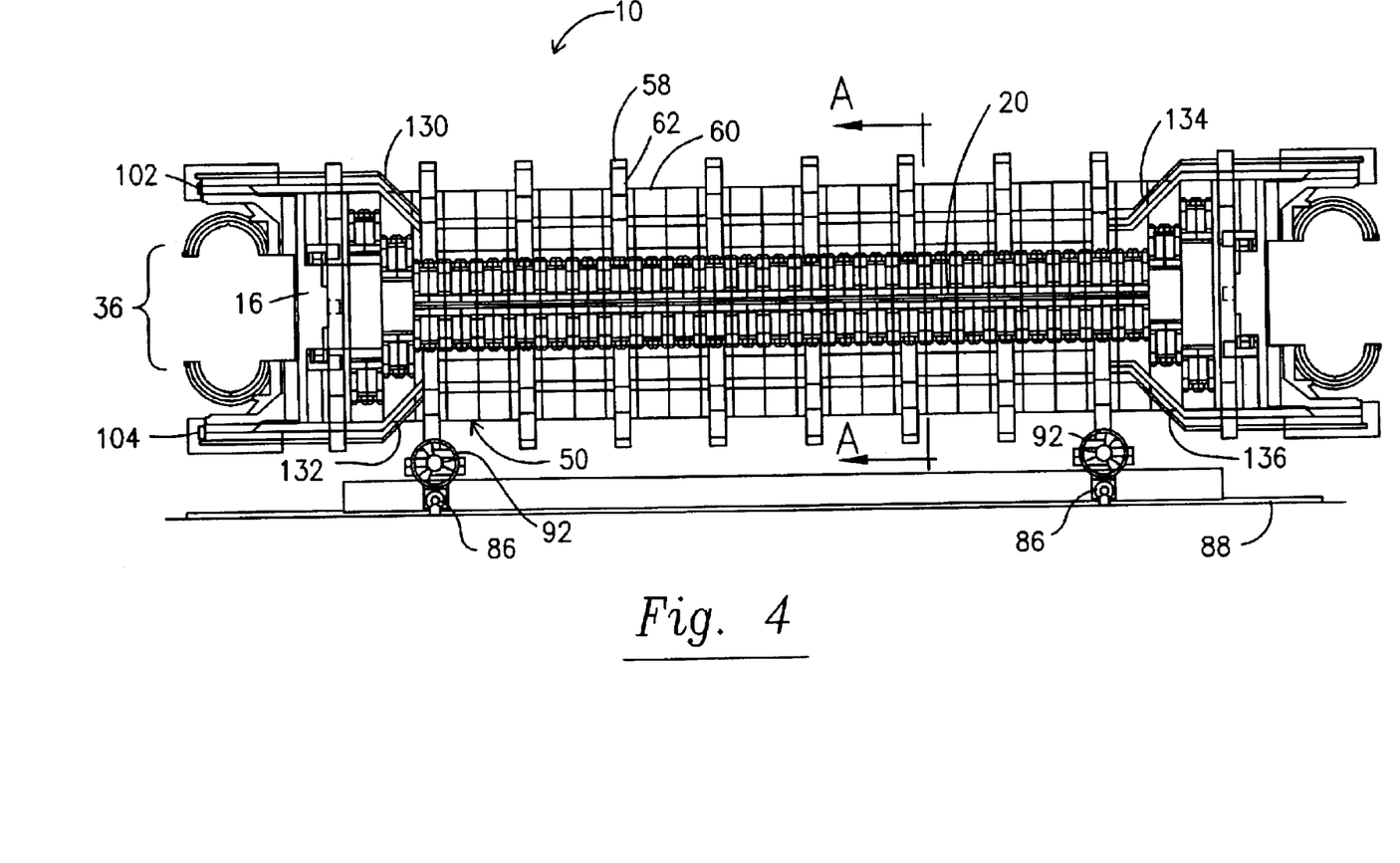
FIG. 4 is a side diagramatic view of the machine of FIG. 3 illustrating the formation of a mold tunnel by a plurality of closed mold block assemblies.

Referring back to FIG. 5, the mold block pair 18 on the left is closed as it is positioned while in molding section 20 and forms internal passage 202. Rollers 102, 104 are contacting raceways 108, 110 which assist in maintaining the mold block halves 120, 122 next to one another. The mold block pair 18 on the right is open. Raceways 112–118 are further apart than raceways 108, 110 and maintain the block halves 120, 122 in an open configuration relative to one another. Referring to FIGS. 3 and 4, transition segments 130–136 move the mold block pairs 18 or 80 relative to the carriage 16 by acting on rollers 102, 104.

As a mold block pair 18 enters transition segments 130, 132 (from left to right in FIG. 4) the rollers 102,104 direct the mold blocks to move from the open position illustrated to the far left to a closed position as illustrated along mold tunnel 20. At the end of the mold tunnel 20, transition segments 134,136 act on rollers 102,104 to direct the mold blocks to an open position as illustrated on the far right, thereby allowing product to be removed from the machine 10.

The mold frames, or holders 138, 140 are connected to a linear guide segment 142 with bearings, such as linear bearings 168 so that the mold halves 120, 122 open and shut at the transition sections 130–136 as illustrated in FIGS. 3 and 4. In the preferred embodiment, the transition segments 130, 132 include a portion of the curved segment 72 at the ends of linear segments 74,76. In fact, although the majority of the curved segment 72 may have a relatively small radius such as about two or three feet, it has been found helpful to have a large radius, such as about twenty to twenty five feet at or near end portions of the transition segments 130, 132 so that adjacent mold block pairs 18 come together without imposing substantial wear on the touching end portions of adjacent mold blocks as they contact to form the molding section 20. Utilizing the linear travel of the mold block halves 120, 122 to close, the radius of curvature in the curve portions of the frame 50 may be made smaller than is common in the prior art for hinged type mold blocks. The use of raceways 130, 132 to close the mold block pairs 18 from an open position allows for a relatively quick closing of the mold blocks 120,122. Accordingly, by reason of the shorter radius of curvature and quicker closing, a shorter die may be utilized. A shorter die allows the use of rapidly setting materials such as polyvinylchloride (PVC) which have not traditionally been deemed suitable in these machines 10. Other methods may also be utilized to open and close the mold block halves 120, 122, instead of or in addition to raceways 108–118 acting on directors or rollers 102, 104.

Figure 7:
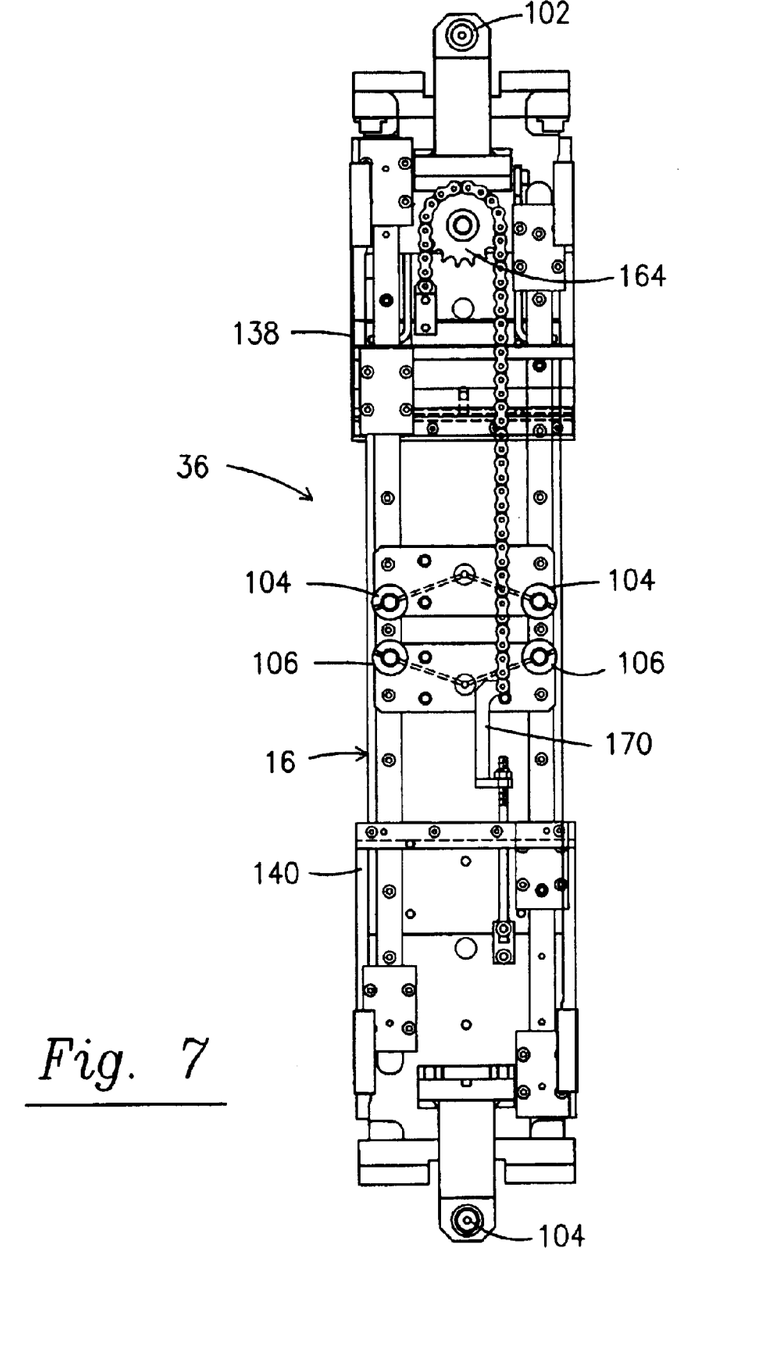
FIG. 7 is a side view of a mold block assembly of the preferred embodiment with the mold blocks removed.

Referring to FIGS. 6 and 7, the mold block assembly 36 has carriage 16 which includes rollers 104, 106 for cooperating with trackway 78. Although only two rollers 104, 106 are shown in FIG. 6, it is anticipated that four or more rollers 104, 106 will be utilized with each assembly 36 in order to provide more stability to the assembly 36 along the trackway 78 as illustrated in FIG. 7. The rollers 104, 106 are preferably eccentric cam rollers, like almost all of the rollers in the preferred machine 10, which allow for precise adjustment of the rollers 104, 106 to ensure that the assembly 36 is balanced and properly oriented to reduce vibrational tendencies and move the mold block pairs 18 in a smooth fashion through the continuous loop 14.

Referring to FIG. 6, rollers 148–154 are located on the ends of the carrier 16 to cooperate with runs 107, 108, or raceways in a slightly different fashion than shown in FIG. 5. These rollers 148–154 maintain the carrier 16 in the runs 107,108 and assist in moving the assemblies 36 about the continuous path 14. Additionally, in the preferred embodiment, two of each of the rollers 148–154 are utilized to assist in stabilizing the carder 16.

The assembly 36 is illustrated in FIG. 7 without the mold block halves 120, 122 and in an open position. An upper and a lower mold holder 138, 140 are spread apart, in an open position. The upper and lower mold holder 138, 140 may be a portion of the mold block halves 120, 122, or more preferably, an element with connectors to hold a mold block half 120, 122 thereto. A mold block frame 160, 162, shown in FIG. 6, may be necessary in some embodiments to connect the holder 138, 140 to the mold block halves 120, 122. A plurality of different embodiments are illustrated in FIGS. 9–12 illustrating different configurations of mold block halves 120, 122 and frames 160, 162.

Referring back to FIG. 7, the preferred embodiment includes connected upper and lower holders 138, 140 through a coupling such as a sprocket 164 connected to a chain 166. The holders 138, 140 have linear bearings 168 which cooperate with linear guide 142 which assist in the opening and closing of the mold halves 120, 122. In the illustrated embodiment, the coupling connects the movement of the halves 120, 122 so that when one of the two holders 138, 140 is moved either inwardly or outwardly, the other holder 138, 140 will move in a similar fashion (inwardly or outwardly). A linkage arm 170 allows for adjustment of the amount of tension of the chain 166. Gravity acting on the lower holder 140 will tend to keep the two holders 138, 140 apart unless the top holder 138 is driven inwardly by the roller 102 riding through the transition 130. This will drive the upper holder 138 inwardly, toward a center of the carrier 16. The chain and sprocket system will pull the lower holder 140 inwardly as well. This brings the facing surfaces 121, 123, 125, 127 of the mold block halves 120,122 together. The lower transition raceway 132 and roller 104 may not be necessary in all embodiments as a result of the chain 166 and sprocket 164 system, however the lower roller 104 and transition raceway 132 are utilized in the presently preferred embodiment.

FIGS. 9–12 show the mold block assembly 36 in more detail. The rollers 148,152 travel along tracks or raceways 156, shown in FIG. 6. The roller 102 is located in mold positioning raceways such as transitions 130–136 shown in FIG. 3, which assist in opening and closing the mold block holders 138, 140. The transitions 130–136 and raceways 108–118, also shown in FIGS. 3 and 5, determine the position of the mold blocks 120, 122 relative to one another as a particular carriage 16 travels around the continuous path 14. Linear bearings 168 slide on guides 142 to allow vertical movement of the mold block pairs 18.

Figure 9:
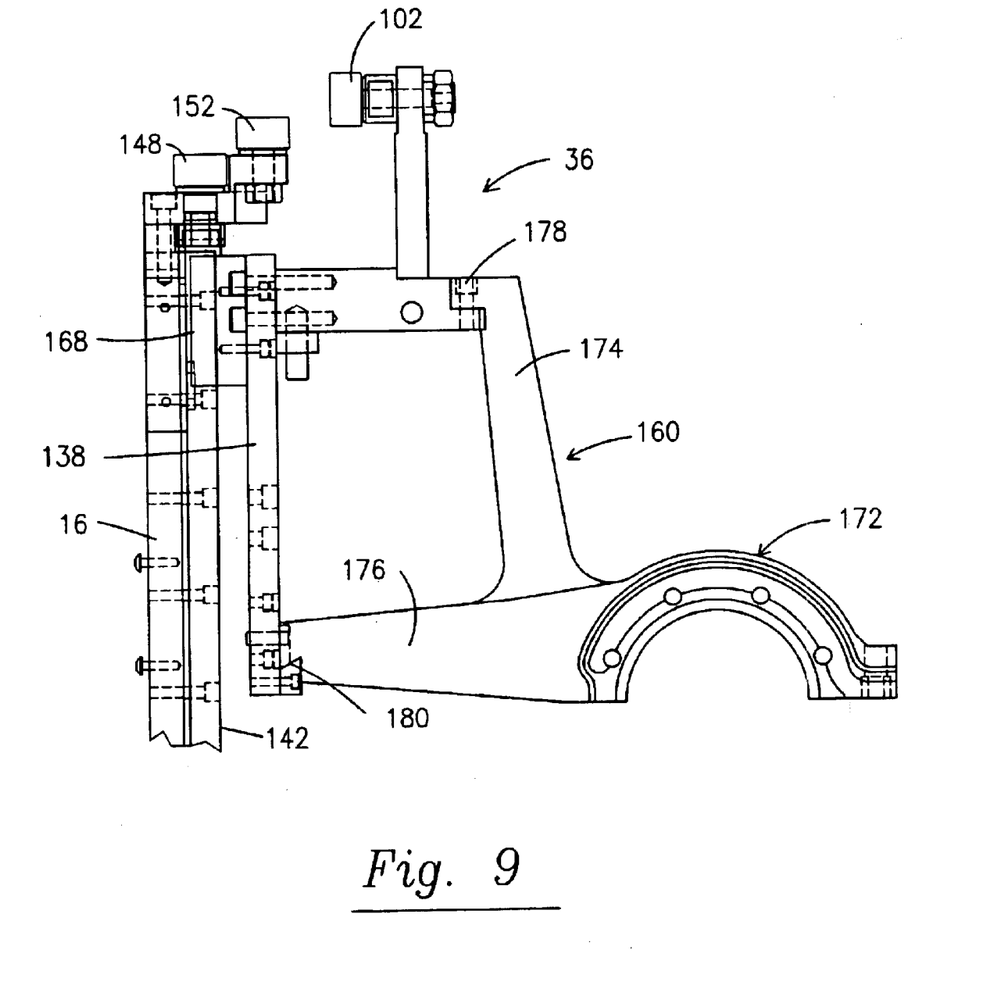
FIG. 9 is a side plan view of a portion of the mold block assembly of FIG. 7 with a first mold block half installed.

FIG. 9 shows a first mold block 172 with a two arms 174, 176 comprising the frame 160. The arms 174, 176 connect the mold block 172 to the holder 138 at connections 178, 180. Connector 180 is a dovetail to dovetail slide fit while connector 178 is preferably a bolt or other connection. By removing connector 178, the friction fit of connector 180 is relieved and the mold block 172 may be pulled up and off the holder 138.

Figure 10:
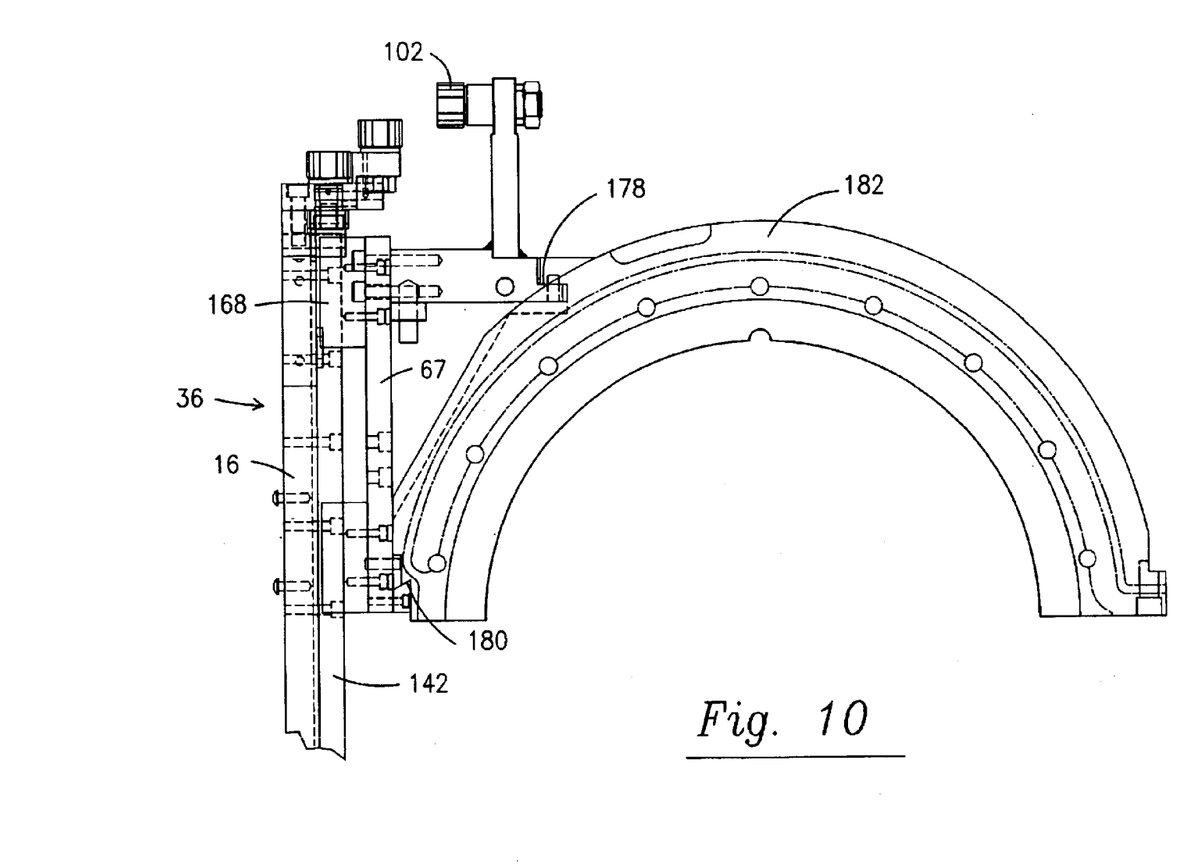
FIG. 10 is a side plan view of a portion of the mold block assembly of claim 7 with a larger mold block half installed.

FIG. 10 is a mold block assembly 36 with an alternative mold block 182. Due to the size of this mold block 182, the connectors may restrain the mold block 182 without the need for a frame 160 as arms 174, 176 as illustrated in FIG. 9. Obviously a larger diameter corrugated pipe product may be manufactured with the mold block 182 of FIG. 10 than with the mold block 172 of FIG. 9.

Figure 12:
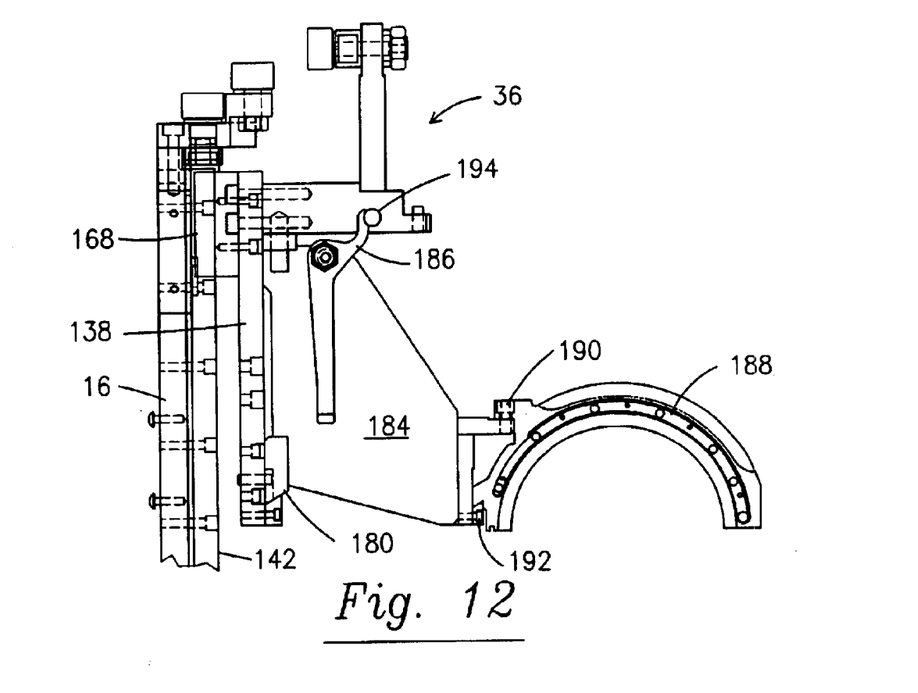
FIG. 12 is a side plan view of a portion of the mold block assembly of FIG. 7 with an adapter mounted with a quick release mechanism.

FIG. 12 is a mold block assembly 36 with an adapter 184. The adapter 184 may be a portion of frame 160 and has a release lever 186 instead of connection 178 in order to assist in connecting a third mold block design 188 to the holder 138. The mold block 188 connects to the adapter 184 at connections 190, 192 which may, or may not be similar to connections 178, 180 of FIG. 9. The adapter 184 connects to the holder 138 at connections 180, 194 and release arm 186 may allow for rapid removal of block 188. The release 186 is designed to allow rapid replacement of mold blocks, as for instance, any of mold blocks 172, 182, 188 with other mold blocks so that a single machine 10 may be utilized with a variety of blocks by the manufacturer. Instead of needing two machines to make two different size or type products, a single machine 10 with multiple sets of mold blocks, such as blocks 172, 182, 188 may be utilized. Almost any mold block pair of any manufacturer may be configured with an adapter 184 for use with the machine 10 of the preferred embodiment.

Figure 11:
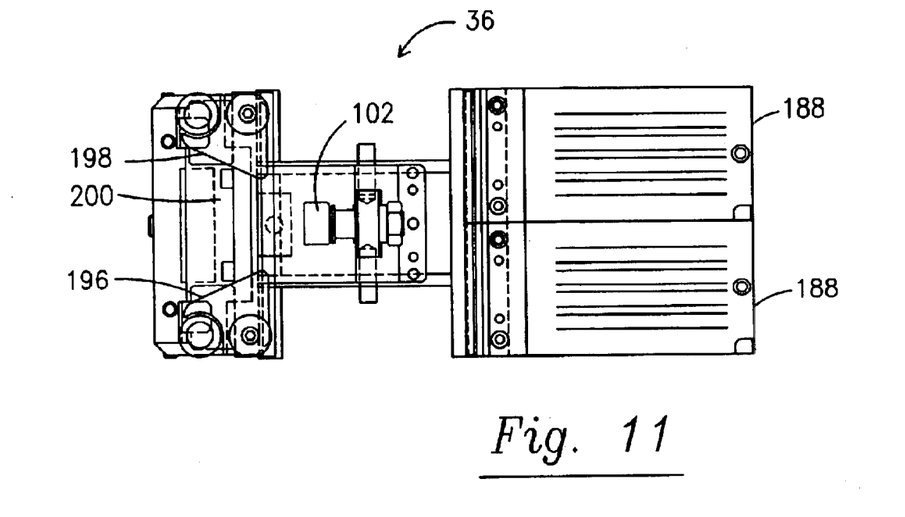
FIG. 11 is a top plan view of the mold block assembly of FIG. 7 showing two top mold block halves mounted in a single carrier.

FIG. 11 is a top view of FIG. 12. Two or more blocks 188 may be utilized with a single mold block assembly 36 depending on the width of each pair of mold blocks 188. For larger and wider blocks 182, one pair of blocks per assembly 36 would likely be more common. Common sizes are four inch widths and eight inch widths. When constructing blocks 18 in standard size widths, one will see the versatility of being able to quickly swap out mold blocks of different sizes in rapid order, a feature of at least some embodiments of the present invention. One machine 10 can be modified in a relatively small period of time to change the product produced.

FIG. 11 also shows the relationship of receiver walls 196,198 which bound a receiver 200 of the mold block assembly 36. This receiver 200 accepts the spoke 30 connected to the drive shaft 28 (shown in FIG. 1) when at the correct position in the continuous path 14. The drive shaft 28 and spokes 30 illustrated in FIGS. 1 and 6 to move the mold block assemblies 36 about the continuous path 14. Electric motor 128 drives the drive shaft 28 which moves the spokes 30. The spokes 30 cooperate with the receivers 200 (illustrated in FIG. 11) in the mold block assemblies 36 to move at least one assembly 36 at a time. Since the preferred embodiment includes a continuous chain of assemblies 36, the driven assemblies 36 push the non-driven assemblies 36 about the continuous path 14.

Alternatively, each mold block assembly 36 may have a rotor 34 of a linear motor connected, integrally or otherwise thereto on the carriage 16. The rotor 34 acts in conjunction with the stator 32 in order to drive the mold block assembly 36 along a continuous path 14 and trackway 78. Other connections for the rotor 34 to the mold block assembly 36 could also be used.

As is shown in FIG. 5, the mold block halves 120,122 include a passageway for connecting the internal mold tunnel 202 with the vacuum manifold 96, the passageway normally defined by a plurality of slits in the lands intersecting axial bores in the mold blocks 120,122 where the bores are connected by an annular groove 119 in the mold blocks 120,122. The vacuum manifold 96 connects with vacuum interface 204 which is preferably attached to vacuum manifold 96. The vacuum interface 204 is preferably mounted with a cushion such as pneumatic cushion 206. Other cushioning devices such as spring type mechanisms could be utilized to maintain the vacuum interface 204 in contact with the vacuum manifold 96 of the mold block pair 18 in the molding section, 20. The pneumatic cushion 206 is able to adjust to expansion of the mold block pair 18 without binding or leakage. Furthermore, the pneumatic cushion 206 may adjust for other movement of the vacuum manifold 96. The vacuum cushion 206 need not be located upstream of the vacuum interface 204 but could even be incorporated as part of the vacuum interface 204. Preferably, the vacuum frame 44 supports the cushion 206, the vacuum interface 204 and the manifold 96. An internal portion of the vacuum frame 44 provides a channel or duct 45 for connecting a vacuum source (not shown) to the vacuum interface 204. In this manner, a vacuum may be drawn in the mold tunnel 202.

It should be understood, however, that still other mold block structures could be used within the scope of the present invention. For example, other air and vacuum systems both internal and external of the mold blocks could be utilized such as those taught by U.S. Pat. Nos. 5,257,924; 4,718,844; and 5,059,109.

As shown in FIG. 2, cooling of mold blocks 18 may be accomplished by cooling nozzles 208 positioned around the mold block assemblies 36 or even within the frame 50 to cool mold block pairs 18. The location of the cooling nozzles 208 are in areas such that the mold block pairs 18 may be reduced in temperature by blowing forced air on the mold blocks 18 at specific locations. A single cooling nozzle 208 may be utilized or multiple cooling nozzles 208 may be utilized at various locations. A sufficient quantity of cooling nozzles 208 may be employed to cool the mold blocks 18 so that internal cooling water systems of the mold blocks is not necessary. This significantly reduces the cost and complexity of mold block assemblies 36 and mold blocks 120, 122. Other cooling air systems such as the system taught in U.S. Pat. No. 5,257,924 could also be utilized.

Another method of cooling which may be utilized is shown in FIG. 1 and includes spraying the mold blocks with a solution (such as water or an evaporable solution) with mister 46. It is preferred that external portions of the mold blocks 18 be sprayed with in relatively small amounts of solution. The liquid may be heated to bring the liquid closer to the temperature where it would evaporate or turn into a gaseous form. As the solution evaporates, a large amount of energy in the form of heat is removed from the mold blocks 18. Since most mold blocks 18 are aluminum, the heat quickly transfers from the hotter internal portions of the mold block 18 to the external sprayed portions for energy removal. A vent 48 including a blower may be utilized to direct the high moisture air away from the work area to maintain a proper level of moisture content in the ambient air. This reduces the likelihood of rusting other portions of the machine 10. Additionally, additives may be added to the solution, including oils, to reduce the possibility of rust. Using this evaporative cooling method, the thermodynamics of the heat of vaporization of the evaporating substance is utilized to increase the efficiency of the cooling process. The vertical orientation of the mold blocks 120,122 facilitates spraying the external surfaces with an evaporating solution without contaminating the internal molding surfaces.

Numerous alternations of the structure herein disclosed will suggest themselves to those skilled in the art. However, it is to be understood that the present disclosure relates to the presently preferred embodiments of the invention which are for purposes of illustration only and not to be construed as a limitation of the invention. All such modifications which do not depart from the spirit of the invention are intended to be included within the scope of the appended claims.

We claim:

1. A machine cooperable with an extruder to continuously mold an extrudable material comprising:
    a continuous trackway;
    a frame supporting the trackway;
    a plurality of separate mold block assemblies restrained to travel about said trackway in succession; and
    at least one pair of mold block halves connected to each of said plurality of mold block assemblies, said mold block halves linearly displaceable from one another and capable of mating engagement to form a mold tunnel.

2. The machine of claim 1 further comprising a linear motor drive system having at least one stator located proximate to the trackway and at least one rotor element connected to at least one of said plurality of mold block assemblies.

3. The machine of claim 1 wherein each the mold block assemblies further comprise a carriage, a guide, and mold block holders, said holders connected to opposing halves of said at least one pair of mold block halves, said carriage restrained to travel substantially about said continuous path, and said guide operatively connecting the holders to the carriage while allowing linear reciprocating movement of the holders to the carriage.

4. The machine of claim 3 further comprising a bearing coupling the mold block holder to the guide.

5. The machine of claim 4 wherein the bearing is a linear bearing.

6. The machine of claim 2 further comprising a control device for controlling the speed of the carriages along a portion of the continuous path.

7. The machine of claim 6 wherein the control device comprise a programmable logic control device.

8. The machine of claim 6 wherein the control device provides at least one signal to the linear motors operating on at least two of said plurality of carriages to propel the two carriages at different speeds.

9. The machine of claim 1 further comprising a plurality of raceways adapted to contact a director, said director connected to at least one of said mold block halves, said raceways locating said mold block halves relative to one another.

10. The machine of claim 3 further comprising a plurality of raceways and at least one director, said raceways locating said mold block halves relative to one another, and said director connected to at least one of the holders.

11. The machine of claim 1 wherein the continuous trackway is substantially oval shaped.

12. The machine of claim 1 wherein the frame is modularly constructed and comprised of a first section and a second section connected at an interface, and said first and second sections having first and second portion of said trackway.

13. The machine of claim 1 wherein the plurality of mold block assemblies substantially abut one another about the continuous path.

14. The machine of claim 1 further comprising a drive rod mechanically adapted to engage at least one of the mold block assemblies at a location about the continuous path to move the assemblies about the continuous path.

15. The machine of claim 1 wherein the frame sits upon rollers and the frame is movable between at least two positions.

16. The machine cooperable with an extruder to continuously mold a product comprising:
    a continuous path;
    a plurality of mold block assemblies restrained to travel about said continuous path, each of said mold block assemblies having a carriage moveable about said path and at least one pair of mold block halves mounted upon each of the carriages, said mold blocks halves oriented to oppose one another, and being linearly displaceable relative to one another, and capable of mating engagement with one another along a molding section of the machine to form a mold tunnel within which the product may be molded.

17. The machine of claim 16 wherein the continuous loop is substantially oval shaped.

18. The machine of claim 16 having at least two molding sections.

19. The machine of claim 16 further comprising at least one cooling nozzle directing compressed air towards at least one of the mold block halves.

20. The machine of claim 19 whereby said cooling nozzle is a cooling vortex nozzle.

21. The machine of claim 16 further comprising a cooling system having a mister and vent, said mister directing a liquid to deposit on a surface portion of at least one of the mold block halves of at least one of the mold block assemblies, said vent adapted to assist in evaporating at least some of the liquid deposited on said surface portion of the at least one mold block half.

22. The machine of claim 21 wherein the vent is coupled to a blower.

23. The machine of claim 21 wherein said liquid is at a temperature above room temperature prior to directing towards the mold block half.

24. The machine of claim 21 wherein the vent is spaced apart from the mold block halves.

25. The machine of claim 16 wherein the carriage is coupled to rollers restricted by a trackway to operate in the continuous loop.

26. The machine of claim 25 wherein the rollers at least assist in carrying the weight of the mold block assembly.

27. The machine of claim 26 further comprising a director connected to at least one of the holders and said director adapted to cooperate with a raceway of the machine to locate a given pair of mold blocks relative to one another.

28. A mold block assembly in combination with an extruder and a machine with plurality of mold block assemblies operated in a continuous loop along a track, said track having at least two curved segments, each of said mold block assemblies following the track and an adjacent mold block assembly, each of said mold block assemblies comprising:

a carriage, a guide, and a first and a second mold block holder, said first holder connected to a first half of a mold block pair, said second holder connected to a second half of the mold block pair, and said guide operatively linking the first and second holders to the carriage and allowing linear displacement of the first and second mold block halves relative to one another.

29. The mold block assembly of claim 28 further comprising an adapter connected to said first holder and said first mold block.

30. The mold block assembly of claim 29 further comprising a release lever, said release lever having a first position connecting the adapter to the first holder and a second position releasing at least a portion of said adapter from said first holder.

31. The mold block assembly of claim 28 further comprising a coupling connecting to the first and second holders, wherein movement of the first holder relative to the carrier in a direction moves the second holder relative to the carrier.

32. The mold block assembly of claim 31 wherein the coupling further comprises a sprocket rotatable relative to and connected to the carrier, and a chain connected to the first and second holders, said chain contacting the sprocket wherein movement of the first holder relative to the carrier moves the chain and the second holder.

33. The mold block assembly of claim 31 wherein movement of the first holder towards a center portion of the carrier moves the second holder toward the center of the carrier.

34. The mold block assembly of claim 28 wherein the holders are adapted to receive at least two different sized mold block halves.

35. The mold block assembly of claim 28 wherein the first and second holders are connected to at least two halves of two mold block pairs.

36. A method for producing an extruded product utilizing a machine having a continuous trackway configured in a continuous path, a frame supporting the trackway, a plurality of separate mold block assemblies restrained to travel about said trackway, and at least one pair of mold block halves connected to each of said plurality of mold block assemblies, said mold block halves linearly displaceable from one another and capable of mating engagement to form a mold tunnel therein, said method comprising the steps of:

forming a mold tunnel along a portion of said continuous path;

extruding an extrudable material within the mold tunnel; and linearly displacing mold block halves at an end of the mold tunnel to allow the extruded product to be removed from the machine.

37. The method of claim 36 further comprising the step of cooling the mold block halves after removing the extruded product from the machine.

* * * * *